UNITED STATES PATENT OFFICE.

WILHELM LOMMEL, OF ELBERFELD, GERMANY, ASSIGNOR TO FARBENFABRIKEN VORM. FRIEDR. BAYER & CO., OF ELBERFELD, GERMANY, A CORPORATION OF GERMANY.

LEUCO DIETHYLGALLOCYANIN.

962,712.

No Drawing.

Specification of Letters Patent. Patented June 28, 1910.

Application filed March 4, 1910. Serial No. 547,213.

*To all whom it may concern:*

Be it known that I, WILHELM LOMMEL, doctor of philosophy, chemist, citizen of the German Empire, residing at Elberfeld, Germany, have invented new and useful Improvements in Leuco Diethylgallocyanins, of which the following is a specification.

In the United States Letters Patent No. 629666 leuco derivatives of gallocyanins are described.

The gallocyanin derived from nitrosodiethylanilin and gallic acid has hitherto not been particularly described and my experience is that by the processes hitherto known for the production of these compounds it cannot be obtained in technical yields.

I have found a process for producing this dye with a good yield, which process consists in using for the condensation salts of the nitroso compound of diethylanilin with such acids as form with the nitroso compound difficultly soluble salts.

My present invention relates to the production of the leuco diethylgallocyanin by treating the diethylgallocyanin (obtained from nitrosodiethylanilin and gallic acid) with reducing agents or executing the reduction by electrolytical methods.

In order to illustrate the new process more fully the following example is given, the parts being by weight:—36 parts of diethylgallocyanin hydrochlorid are stirred together with water and 30 parts of hydrochloric acid 19° Bé. and 9 parts of zinc dust are slowly added. The reaction is complete after the mixture has been stirred for some time on gently heating. The new leuco compound separates from the filtrate after some time. It can be used as paste or it is filtered off, washed and dried. It is in the shape of its hydrochlorid a greenish powder soluble in concentrated sulfuric acid with a reddish-gray coloration. It is soluble in water with a greenish-yellow color. The free base is separated from its aqueous solution by the addition of sodium acetate. The free base soon turns blue in consequence of oxidation.

I claim:—

The herein described new leuco compound of diethylgallocyanin, which is in the shape of its hydrochlorid a greenish powder soluble in water with a greenish-yellow color, dissolving in concentrated sulfuric acid with a reddish-gray color; the free base being separated by the addition of sodium acetate to the aqueous solution of the hydrochlorid, the free base soon turning blue in consequence of oxidation, substantially as described.

In testimony whereof I have hereunto set my hand in the presence of two subscribing witnesses.

WILHELM LOMMEL. [L. S.]

Witnesses:
 OTTO KÖNIG,
 CHAS. J. WRIGHT.